(12) United States Patent
Määttä et al.

(10) Patent No.: US 6,319,407 B1
(45) Date of Patent: Nov. 20, 2001

(54) METHOD AND SYSTEM FOR PURIFICATION OF WASTE WATER

(75) Inventors: Raimo Määttä, Helsinki; Matti Viitasaari, Klaukkala; Antonio Villarreal, Espoo, all of (FI)

(73) Assignees: Sakkivaline Oy, Helsinki; Systox Oy, Espoo, both of (FI)

(*) Notice: Subject to any disclaimer, the term of this patent is extended or adjusted under 35 U.S.C. 154(b) by 0 days.

(21) Appl. No.: 09/401,473

(22) Filed: Sep. 22, 1999

(30) Foreign Application Priority Data

Oct. 14, 1998 (FI) .................................................. 982233

(51) Int. Cl.[7] ............................................... C02F 3/02
(52) U.S. Cl. ..................... 210/615; 210/150; 210/620; 210/758; 210/739; 210/220
(58) Field of Search ................... 210/603, 605, 210/614, 615–617, 620–628, 739, 758–760, 220, 150

(56) References Cited

U.S. PATENT DOCUMENTS 4,655,925  4/1987  Tabata et al. .

FOREIGN PATENT DOCUMENTS

| 44 09 435 | 9/1994 | (DE) . |
| 195 23 707 | 1/1997 | (DE) . |
| 0 203 549 | 12/1986 | (EP) . |
| 0 714 857 | 6/1996 | (EP) . |
| 97/28094 | 8/1997 | (WO) . |

Primary Examiner—Chester T. Barry
(74) Attorney, Agent, or Firm—Altera Law Group, LLC

(57) ABSTRACT

Method and system for the purification of waste water. In the method, all purification functions, including removal of nitrogen and phosphor, are performed in one and the same reactor (1), in which several alternating oxidation and reduction zones (2–6) are created in unclarified waste water flowing through it by supplying each zone with gas mixtures with different oxygen contents as needed for the purification function to be performed in the zone from a gas distributor (8), in such manner that oxygen-rich gas containing 30–50% oxygen is supplied for oxidation while gas with a low oxygen content of 0–5% is supplied for reduction. A solid support (7) for increasing the biomass together with the biomass adhering to it is exposed to alternating oxidation and reduction zones so that the waste water to be purified and the biomass are subjected to an abrupt variation of conditions, in which phosphor is alternately bound and dissolved in biomass growth and nitrogen compounds are oxidised into nitrate, to be reduced in the next zone into nitride and further into nitrogen gas. The process is controlled and regulated by optimising the oxygen content of the gas used. The solids level in the reactor is controlled and excess solid matter is removed directly from the reactor space by means of a flotation unit (21), from where the surface sludge is removed entirely without returning any portions of it into the process.

32 Claims, 1 Drawing Sheet

METHOD AND SYSTEM FOR PURIFICATION OF WASTE WATER

Figure 1:
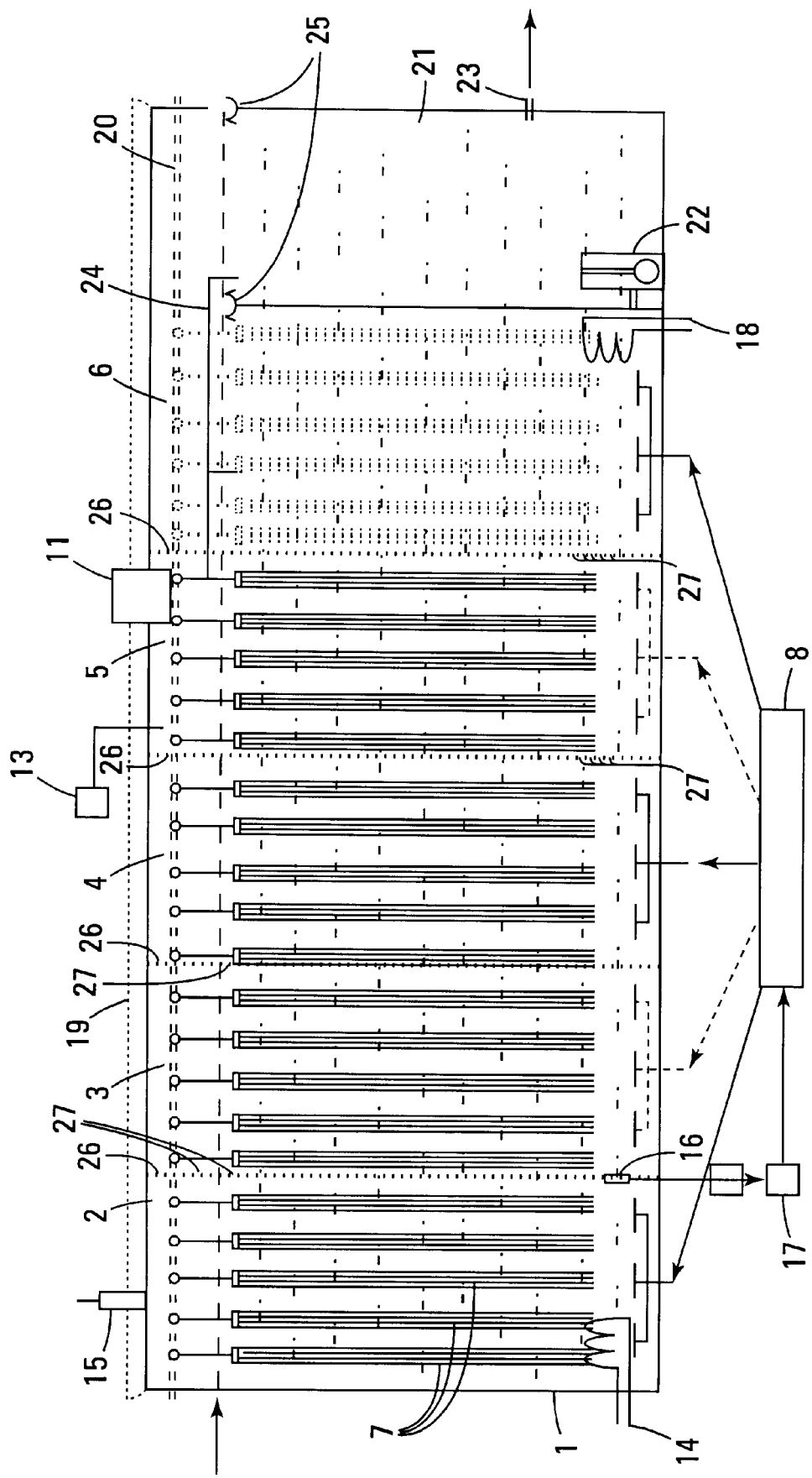

The present invention relates to a system as defined in the preamble of claim 1. Moreover, the invention relates to a system as defined in the preamble of claim 12.

In particular, the invention concerns a method and system for the purification of waste water produced by residential areas and industry, e.g. paper and pulp industry, that allow a considerably more effective and cheaper treatment of waste water to remove e.g. organic matter (so-called $BOD_7$ reduction), nutrient compounds, dyes and organic chlorine compounds dissolved in it than is possible with the methods currently used.

At present, the most commonly used biological process used in waste water treatment is the so-called activated sludge process, of which there are several variants in use. These methods use various expedients to increase the efficiency of the process, e.g. reactor spaces or sub-processes arranged in cascade or separated by partitions, use of pure oxygen, various solid supports, chemicals, etc. If nitrogen or phosphor is to be removed, separate units are often needed. However, almost all variants of the activated sludge process are still based on conventional aeration and separation of solids from water by sedimentation and on sludge return. These processes require large preliminary and final sedimentation plants, and the investment costs for these may amount to as much as one half of the total investment costs of the waste water treatment plant as a whole. Consequently, sewage treatment plants are structurally large, complex and expensive.

The object of the present invention is to eliminate the drawbacks described above and in particular to disclose an efficient and advantageous method and a system that takes up only a small space and obviates the need for preliminary and final sedimentation plants involving high investment costs.

The method of the invention is characterised by what is presented in claim 1. The system of the invention is characterised by what is presented in claim 12.

According to the invention, all purification functions, including nitrogen and phosphor removal, are performed in one and the same reactor vessel containing solid support to increase the biomass. In the vessel, oxidation and reduction zones, either predetermined or changing according to a given program, are created in the waste water mass flowing through it by supplying gas mixtures having an optimal oxygen content into the flow at different points in the direction of flux. The solid support and the biomass (microbial mass) adhering to it can be moved automatically e.g. by means of a suitable transfer gear, causing the biomass adhering to the solid support to move rapidly from zone to zone so that it is subjected to abruptly changing conditions. Alternatively, the solid support can be held stationary while periodically alternating oxidation and reduction conditions are created at the same point in the reactor vessel so that the biomass adhering to the solid support is subjected to abruptly changing conditions. In both cases, the phosphor in the biomass is alternately dissolved and bound in biomass growth; nitrogen compounds are oxidised, to be reduced in the next zone into nitride and further into nitrogen gas, which can be recovered or removed into the atmosphere. The amount of solid matter (biomass) in the reactor is regulated by removing activated sludge directly from the reactor basin into sludge treatment via a flotation compaction stage.

A significant advantage in a purification plant constructed according to the invention is that it obviates the need for sludge return and conventional preliminary, intermediate and final sedimentation, with the result that the investment costs are substantially lower, only a fraction of the conventional costs. Also, the size of the treatment plant is substantially smaller than that of a conventional plant. A further advantage of the invention is that the process works with large amounts of biomass, so it is not sensitive to variations in the quality of the incoming waste water. Moreover, control and regulation of the process are easier than in conventional processes.

Other preferred features and embodiments of the method are presented in the sub-claims.

In the system of the invention, the means for carrying out purification operations comprise a reactor vessel in whose interior different alternating oxidation and purification zones are so arranged that all purification operations for waste water treatment take place in one and the same reactor vessel while each purification zone performs a mainly predetermined purification operation and the waste water is subjected to all of the various purification operations as it passes through the reactor vessel. The solid support for increasing biomass and the biomass adhering to it are arranged to be exposed to successive oxidation and reduction operations in oxidation and reduction zones. A gas distributor is arranged to produce in each zone a gas mixture with an optimal oxygen content as needed for the purification operation to be performed in that zone, producing oxygen-rich gas with a 30–50% oxygen content for the oxidation zones and low-oxygen gas with a 0–5% oxygen content for the reduction zones. In a flotation zone, solid matter is brought to the surface by means of a small flotation unit and removed automatically as surface sludge e.g. by means of a floating knife.

The invention has the advantage that, as all the operations and sub-processes associated with waste water purification take place in one and the same reactor space, simultaneously using a solid support at each stage and a suitable gas mixture instead of air or pure oxygen in each sub-process, a particularly efficient purification process and system requiring only a small space is achieved. In the same space, different zones are created in which the various purification operations take place. Since the method does not involve any preliminary, intermediate or final sedimentation, each of which would require a special sedimentation basin and sludge return into the process, the number of parts comprised in the system is significantly reduced and a very advantageous system in respect of costs is achieved.

In an embodiment of the system, the boundary between the conditions in adjacent purification zones is a stepless boundary.

In an embodiment of the system, the purification zones are arranged horizontally one after the other, with the waste water flowing in a horizontal direction in the reactor vessel.

In an embodiment of the system, different conditions in respect of oxygen content are created in the purification zones by using different gas mixtures and/or a flow of gas mixture.

In an embodiment of the system, the gas mixture comprises air, oxygen, nitrogen and/or carbon dioxide or some other suitable gas.

In an embodiment of the system, the reactor vessel comprises partitions provided with flow-through openings.

In an embodiment of the system, biomass containing plenty of bacteria is placed in the reactor vessel.

In an embodiment of the system, the solid support comprises substantially long bristle-like hairs tied in bundles like those in a brush and attached to a device provided with a drive means so that the entire solid support and the biomass adhering to it or desired parts of it are automatically moved from zone to zone in accordance with a predetermined program.

In an embodiment of the system, the solid support comprises substantially large pieces of inert solid material which are buoyant, suspended, stationary e.g. sheets and/or tied to stationary cages or the like.

In an embodiment of the system, the solid support comprises substantially small pieces of solid, porous and/or filamentous structure.

In an embodiment of the system, the solid support comprises fine-grained material particles.

In an embodiment of the system, the system comprises means for generating a pressure and/or vacuum in the interior of the reactor vessel.

In an embodiment of the system, the system comprises means for changing the temperature of the water flowing in the reactor vessel, such as freezing, cooling and/or heating.

In an embodiment of the system, the system comprises means for adding chemicals increasing the efficiency of the purification process into the waste water to be purified.

In an embodiment of the system, the chemicals to be added include enzymes for decomposition of organic matter, sedimentation chemicals for removal of phosphor compounds, reducing agents for removal of nitrogen compounds, chemicals for regulation of the pH of the waste water, chemicals for binding metals and promoting the compaction of the biomass and/or micro-nutrients for improving the efficiency of the process.

In an embodiment of the system, the system comprises a sensor for sensing the oxygen content of the waste water and a control device arranged to automatically adjust the gas distributor on the basis of the oxygen content so as to optimise the oxygen content and/or amount of the gas mixture supplied to each zone.

In an embodiment of the system, the purification operations comprise separate, partially simultaneous and/or simultaneous sedimentation, oxidation, nitrification and denitrification operations.

In an embodiment of the system, the purification zones have been arranged to implement purification operations including removal of dissolved organic matter by the use of bacteria (so-called $BOD_7$ reduction), removal of phosphor compounds biologically and/or via addition of sedimentation chemicals to bring soluble phosphor compounds into a solid form separable from water, removal of nitrogen compounds via nitrification and denitrification, removal of dyes, and/or removal of organic chlorine compounds (AOX).

In the following, the invention will be described in detail by the aid of a few examples of its embodiments with reference to the attached drawing, which presents an embodiment of the system of the invention.

FIG. 1 presents a system for continuous purification of waste water. The system is called a high-power bioreactor. The system comprises means for performing a number of different purification operations. In the interior of a reactor vessel 1, purification zones 2–6 differing from each other in respect of the conditions prevailing in them have been arranged one after the other in the direction of flow, i.e. in a horizontal direction. The reactor vessel 1 may be provided with a number of partitions 26, that include flow-through openings 27, between the different zones. The number of zones may also be larger and the reactor vessel may be of a different shape (e.g. circular, ring-like) than in the example presented in FIG. 1. The purification operations to be performed are removal of organic matter by the use of bacteria (so-called $BOD_7$ reduction), removal of phosphor compounds biologically and/or via addition of sedimentation chemicals to bring soluble phosphor compounds into a solid form separable from water, removal of nitrogen compounds via nitrification and denitrification or by other methods, removal of dyes, removal of organic chlorine compounds (AOX), and removal of excess solid matter from the bioreactor by means of a small flotation unit. All the above-mentioned waste water purification operations take place in one and the same reactor vessel 1, unclarified waste water being supplied into the reactor from the left while purified water is let out from the reactor via its right-hand end. The purified water can be passed into the water system without a separate sedimentation plant. All of the excess solid matter separated by flotation is passed to a sludge treatment stage without being returned into the process. Each purification zone 2–6 performs a mainly predetermined purification operation, yet so that between the operations there is a stepless transition from one stage to the next and so that the process can also be controlled automatically by adjusting the oxygen content of the gases supplied into different zones.

As it passes through the reactor vessel 1, the waste water is exposed to all the various purification operations. To achieve the desired fast phase transition, the solid support 7 is arranged to be moved automatically from one zone to the next. A gas distributor 8 produces for each purification zone 2–6 a gas mixture with an optimal oxygen content as needed for the purification operation to be performed in that zone. The conditions in the purification zones are regulated according to a program using optimal gas mixtures with different oxygen contents and by varying the flow of waste water and gas.

In the example in FIG. 1, the direction of flow of waste water is from left to right. The waste water, without having undergone any presedimentation, first reaches purification zone 2, where oxidation and nitrification as mentioned above take place; phosphor is bound to solid matter. The gas distributor 8 supplies an oxygen-rich gas mixture (with a 30–50% oxygen content) into zone 2. From here, the waste water proceeds into purification zone 3, where denitrification takes place; phosphor is dissolved. A gas mixture containing little or no oxygen (0–5% oxygen) is supplied into the purification zone 3 from the gas distributor. In the next zone 4, oxidation and nitrification again take place, so this zone is supplied with a gas mixture containing plenty of oxygen; phosphor still remaining in the waste water is bound. In purification zone 5, the waste water is further denitrified and gas with little or no oxygen is supplied into it; phosphor is dissolved. In zone 6, oxidation again takes place, so this zone is supplied with an oxygen-rich gas mixture; phosphor is bound. Depending on the case, the order and number of the zones may differ from the example. The solid supports and the biomass adhering to them are moved automatically from one zone to the next, so the biomass is exposed to the same abrupt changes of conditions as the waste water. The level of solid matter in the bioreactor is adjusted using a small flotation unit 21, in which the surface sludge is shaved off with a floating knife 24 or removed in some other way and passed to a sludge treatment stage. The reactor vessel 1 may be provided with a cover 19.

The reactor 1 contains a large amount of biomass. The effect of the amount of biomass (number of bacteria) is such that, as the amount of biomass is multiplied, the purification efficiency is also multiplied. For enhanced reduction of $BOD_7$, plenty of oxygen is required, which is why an oxygen-rich gas mixture instead of air is supplied into the oxidation zones.

Enhanced biomass growth is implemented via immobilisation. The amount of biomass in a conventional aeration tank in an activated sludge process is 3–5 kg/m$^3$. It is not possible to make a normal water sludge suspension retain more sludge without considerable overdesign of e.g. a final sedimentation plant. When the biomass is full of filamentous bacteria, it is light and requires a large space. In this case, the sludge is called bulking sludge. The sludge content may fall to 0.5–2 kg per cubic meter. In the high-power bioreactor of the invention, the sludge content may be as high as 10–15 kg/m$^3$ or more.

Immobilisation of biomass can be implemented using a solid support 7, which may be in the form of large pieces, small pieces and/or fine-grained material particles. The pieces of solid support or filler material 7 bind biomass on their surface.

As shown in the figure, the solid support 7 preferably comprises substantially long bristle-like hairs tied into bundles like those in a brush, and the brushes are connected to a transfer gear 11 provided with a drive means so that the entire solid support together with the biomass adhering to it or desired parts of it are automatically moved from one zone to the next in accordance with a predetermined program.

The solid support 7 may also consist of freely floating, suspended or solid, stationary sheets or bundles, sheets or bundles attached to movable brackets, or pieces of inert material placed in wire cages.

The solid support 7 may also consist of small filler pieces made of different materials of either fully solid, porous or filamentous structure.

Further, the solid support 7 may consist of very fine-grained material particles which bind biomass around them, thus increasing the total amount of biomass.

From normal activated sludge, compact biomass containing a large amount of organic matter per unit volume can be developed by utilising various chemicals and physical or biological factors. The development of compact biomass in the high-power reactor is implemented by omitting the normal presedimentation stage, with the result that the waste water entering the process contains a larger than normal amount of organic matter. The large amount of organic matter promotes the growth of the load and contributes towards making the process more efficient, towards biological removal of nutrients (binding of phosphates, oxidation of nitrogen compounds via nitrification and their elimination via denitrification).

Other factors promoting compaction of biomass include a correct pH and addition of certain chemicals (Ca, Mg, organic materials to assist binding) as far as possible, especially in the early part of the process. For this purpose, among other things, the system may comprise means 15 for the addition of chemicals. The physical measures include a correct mixing method, thermal treatment of the sludge (heating or cooling), freezing, application of pressure/vacuum, etc. All these expedients, either all or some of them together or each one separately, may be used to increase the amount of biomass. For these purposes, the system comprises means 14 which can be used for heat treatment of the waste water, either cooling, freezing or heating it as necessary. The system further comprises means 13 for generating an overpressure and/or vacuum in the interior of the reactor.

Using means 15, it is also possible to add other chemicals into the waste water flowing in the reactor 1 to increase the efficiency of the process. Such chemicals include e.g. enzymes for decomposing organic matter, sedimentation chemicals for removal of phosphor compounds, chemicals for adjusting the pH of the waste water, chemicals for binding metals and promoting compaction of the biomass and/or micronutrients for increasing the efficiency of the biological process.

The amount of oxygen needed in the process can be adjusted via automatic control of the gas distributor 8 by using a controller 17 whose operation is based on the measurement of oxygen content by an oxygen sensor 16 placed in the reactor.

The process works without the conventional sedimentation stages (preliminary, intermediate and final sedimentation plants) and without sludge return. Consequently, the size and construction costs of the purification plant of the invention are less than half of those of conventional plants.

The system comprises a transfer gear 11, presented diagrammatically in FIG. 1 as a drive carriage moving on rails, by means of which the filler pieces 7 loaded with biomass can be moved continuously or periodically from one purification zone 2–6 to the next in the reactor vessel 1. The transfer gear 11 can also be moved vertically by means of two vertical drive shafts, in which case the threadlike filler pieces 7 lie in a horizontal plane and are attached to a belt-like support mounted so that it is carried by the drive shafts.

From the water purified in the purification zones 2–6, excess solid matter is separated in a flotation unit 21, where the air dissolved in the water in pressurised state brings solid matter present in the water to the surface as it passes through dispersion jets 22 and is discharged from the jets in the form of small bubbles. The purified water free of solid matter flows out via a pipe 23 and it can be passed directly into the water system without a separate sedimentation stage. The solid matter brought to the surface in the flotation unit is removed e.g. by means of a floating knife 24 moving back and forth into chutes 25, from where it is conveyed to a sludge treatment stage, without the necessity to return the solid matter or any portions of it into the process.

The process produces thermal energy, which can be recuperated by using a heat exchanger 18.

The invention is not restricted to the examples of its embodiments described above, but many variations are possible within the scope of the inventive idea defined in the claims

What is claimed is:

1. Method for the purification of waste water, in which method a number of different purification operations are performed to remove organic matter contained in the waste water, to remove nutrient compounds and/or to remove other harmful compounds from the waste water, characterised in that all purification functions, including nitrogen and phosphor removal, are performed in one and the same reactor, in which several alternating oxidation and reduction zones are created in unclarified waste water flowing through it by supplying each zone with gas mixtures with different oxygen content as needed for the purification function to be performed in the zone, in such manner that oxygen-rich gas containing 30–50% oxygen is supplied for oxidation while gas with a low oxygen content of 0–5% is supplied for reduction;

a solid support for increasing biomass and the biomass adhering to it are exposed to alternating oxidation and reduction zones so that the waste water to be purified and the biomass are subjected to an abrupt variation of conditions, in which phosphor is alternately bound in biomass growth and dissolved and nitrogen compounds are oxidised into nitrate, to be reduced in the next zone into nitride and further into nitrogen gas;

the process is controlled and regulated by optimising the oxygen content of the gas used;

the solids level in the reactor is controlled and excess solid matter is removed directly from the reactor space via flotation; and the surface sludge obtained from the reactor is removed entirely without returning any portions of it into the process;

the water leaving the reactor being so clean that it can be passed directly into the water system without a conventional sedimentation plant.

2. Method as defined in claim 1, characterised in that successive alternating oxidation and reduction zones are formed at different points in the reactor vessel, and the biomass is exposed to the oxidation and reduction zones by moving the solid support and the biomass adhering to it from one zone to the next independently of the flow of the waste water to be purified.

3. Method as defined in claim 1, characterised in that the solid support is held stationary while different conditions are created in the same zone in the reactor vessel by changing at given time intervals the gas mixture supplied into the zone, oxygen-rich gas and gas with a low oxygen content being supplied alternately.

4. Method as defined in claim 1 characterised in that a gas mixture containing air, oxygen, nitrogen and/or carbon dioxide or other gases is supplied to the purification zones.

5. Method as defined in claim 1, characterised in that the proportions of different materials present in the waste water to be purified are measured and the flow of gas mixture into the purification zones is adjusted.

6. Method as defined in claim 5, characterised in that the oxygen content of the waste water in the reactor vessel is measured and, based on the measured oxygen content, the oxygen content of the gas mixture supplied into each zone is adjusted to an optimal level.

7. Method as defined in claim 1 characterised in that, in order to form compact biomass containing a large amount of bacteria per unit volume, the operations to be performed are selected from the following: immobilising biomass on the solid support; supplying waste water without presedimentation into the reactor vessel; adjusting the pH to a value favorable for bacterial growth; adding chemicals promoting binding; mixing the biomass in the reactor vessel and generating a pressure or a vacuum in the reactor vessel.

8. Method as defined in claim 7, wherein adding chemicals includes adding at least one of calcium, magnesium and organic matter.

9. Method as defined in claims 1, characterised in that solid support is removed continuously or periodically from the reactor vessel, the biomass is separated from the solid support and the solid support or a portion of it is returned into the reactor vessel.

10. Method as defined in claim 1, characterised in that chemicals increasing the efficiency of the waste water purification process are added into the waste water to be purified, said chemicals including enzymes for decomposing organic matter, sedimentation chemicals for removal of phosphor compounds, chemicals for adjusting the pH of the waste water, chemicals for binding metals and promoting compaction of the biomass, and/or micronutrients for increasing the efficiency of the process.

11. Method as defined in claim 1, characterised in that, in the method, dissolved organic matter is removed by using bacteria (so-called $BOD_7$ reduction), phosphor compounds are removed biologically or via the addition of sedimentation chemicals by bringing soluble phosphor compounds into a solid form separable from water, nitrogen compounds are removed via nitrification and denitrification, dyes are removed, or organic chlorine compounds are removed.

12. Method as defined in claim 1, characterised in that the waste water to be purified is clarified at the beginning of the process, at the end of the process or at some other stage of the process.

13. System for the purification of waste water, said system comprising means for carrying out a number of different purification operations to remove organic matter contained in the waste water, to remove nutrient compounds and/or other harmful compounds from the waste water, characterised in that the means for carrying out purification operations comprise a reactor vessel (1), in whose interior different oxidation and reduction zones (2–6) are so arranged that all purification functions associated with the purification of waste water take place in one and the same reactor vessel while each one of the purification zones performs a mainly predetermined purification operation and the waste water is exposed to all of the various purification operations as it passes through the reactor vessel, solid support (7) for increasing the biomass, said solid support and the biomass adhering to it being exposed to successive oxidation and reduction operations in the oxidation and reduction zones (2–6), a gas distributor (8) arranged to produce in each zone (2–6) a gas mixture having an optimal oxygen content as needed for the purification function to be performed in the zone, in such manner that the gas distributor produces oxygen-rich gas containing 30–50% oxygen for the oxidation zones and gas with a low oxygen content of 0–5% for the reduction zones;

a flotation unit (21) arranged to remove excess solid matter in the form of surface sludge from the reactor space.

14. System as defined in claim 13, characterised in that the boundary between adjacent purification zones is a stepless boundary.

15. System as defined in claim 13, characterised in that the purification zones (2–6) are disposed horizontally in succession, the waste water flowing in a horizontal direction in the reactor vessel.

16. System as defined in claim 13, characterised in that different conditions in the purification zones (2–6) are implemented using gas mixtures differing in respect of oxygen content and/or via regulation of the flow of gas mixture.

17. System as defined in claim 16, characterised in that the gas mixture comprises air, oxygen, nitrogen and/or carbon dioxide, or some other gas.

18. System as defined in any one of claims 13, characterised in that biomass containing a large amount of bacteria is disposed in the reactor vessel (1).

19. System as defined in claim 13, characterised in that the solid support (7) comprises substantially long bristle-like hairs tied in bundles forming brush-like arrays which are attached to a transfer gear (11) provided with a drive means so that the entire solid support and the biomass adhering to it or desired portions of it are automatically moved from zone (2–6) to zone in accordance with a predetermined program.

20. System as defined in claim 13, characterised in that the solid support (7) comprises pieces of inert solid material.

21. System as defined in claim 20, wherein the pieces of inert solid material are buoyant, stationary or fixed.

22. System as defined in claim 20, wherein the pieces of inert solid material are confined within cages.

23. System as defined in claim 13, characterised in that the solid support (7) comprises substantially small pieces having a solid, porous or filamentous structure.

24. System as defined in claim 13, characterised in that the solid support (7) comprises fine-grained material particles.

25. System as defined in claim 13, characterised in that the system comprises means (13) for generating a pressure or a vacuum in the interior of the reactor vessel (1).

26. System as defined in claim 13, characterized in that the system comprises means (14) for effecting a change in the temperature of the water flowing in the reaction vessel (1).

27. System as defined in claims 13, characterised in that the system comprises means (15) for adding chemicals increasing the efficiency of the purification process into the waste water to be purified.

28. System as defined in claim 27, characterised in that the chemicals to be added include enzymes for decomposition of organic matter, sedimentation chemicals for removal of phosphor compounds, reducing agents for removal of nitrogen compounds, chemicals for regulation of the pH of the waste water, chemicals for binding metals and promoting the compaction of the biomass or micronutrients for improving the efficiency of the process.

29. System as defined in claims 13 characterised in that the system comprises a sensor (16) for sensing the oxygen content of the waste water and a control device (17) arranged to automatically adjust the gas distributor (8) on the basis of the oxygen content so as to optimise the oxygen content and/or amount of the gas mixture supplied to each zone (2–6).

30. System as defined in any claim 13, characterised in that the purification operations (2–6) comprise separate, partially simultaneous or simultaneous sedimentation, oxidation, nitrification and denitrification operations.

31. System as defined in claim 13, characterized in that the purification zones (2–6) have been designed to implement purification operations including removal of dissolved organic matter by the use of bacteria (so-called $BOD_7$ reduction), removal of phosphor compounds biologically or via addition of sedimentation chemicals to bring soluble phosphor compounds into a solid form separable from water, removal of nitrogen compounds via nitrification and denitrification, removal of dyes, or removal of organic chlorine compounds.

32. System as defined in claim 13, wherein the reactor vessel comprises partitions provided with flow-through openings.

* * * * *